(12) United States Patent
Mao et al.

(10) Patent No.: US 7,713,909 B2
(45) Date of Patent: May 11, 2010

(54) CATALYZED DIESEL SOOT FILTER AND PROCESS

(75) Inventors: Fuhe Mao, Rochester Hills, MI (US); Cheng G. Li, Troy, MI (US); Robin Ziebarth, Midland, MI (US)

(73) Assignee: Dow Global Technologies Inc.

( * ) Notice: Subject to any disclaimer, the term of this patent is extended or adjusted under 35 U.S.C. 154(b) by 207 days.

(21) Appl. No.: 11/664,467

(22) PCT Filed: Oct. 13, 2005

(86) PCT No.: PCT/US2005/037298

§ 371 (c)(1),
(2), (4) Date: Mar. 30, 2007

(87) PCT Pub. No.: WO2006/044822

PCT Pub. Date: Apr. 27, 2006

(65) Prior Publication Data

US 2009/0004078 A1    Jan. 1, 2009

(51) Int. Cl.
*B01J 23/10* (2006.01)
*B01J 23/04* (2006.01)

(52) U.S. Cl. .............. 502/304; 502/344; 502/303; 423/641

(58) Field of Classification Search .......... 423/212, 423/213.2, 213.5, 594.15, 641; 502/303, 502/304

See application file for complete search history.

(56) References Cited

U.S. PATENT DOCUMENTS

| | | | |
|---|---|---|---|
| 4,476,246 A * | 10/1984 | Kim et al. ............. | 502/304 |
| 4,515,758 A | 5/1985 | Domesle et al. | |
| 5,059,575 A * | 10/1991 | Jorgensen et al. ........ | 502/304 |
| 5,075,274 A | 12/1991 | Klyohide et al. | |
| 5,098,455 A | 3/1992 | Doty et al. | |
| 5,108,977 A | 4/1992 | Yoshida et al. | |
| 5,141,714 A | 8/1992 | Obuchi et al. | |
| 5,320,999 A | 6/1994 | Muramatsu et al. | |
| 5,340,548 A | 8/1994 | Abe et al. | |
| 6,245,306 B1 | 6/2001 | Miyazaki et al. | |
| 6,248,689 B1 | 6/2001 | Manson | |
| 6,555,081 B2 * | 4/2003 | Hori et al. ............. | 423/239.1 |
| 7,431,895 B2 * | 10/2008 | Pfeifer et al. ........... | 422/177 |

FOREIGN PATENT DOCUMENTS

| | | |
|---|---|---|
| EP | 1356864 A1 | 4/2002 |
| EP | 1403231 A1 | 5/2002 |
| WO | WO01/45828 A1 | 6/2001 |
| WO | WO03/051488 A1 | 6/2003 |
| WO | WO03/078352 A1 | 9/2003 |
| WO | WO03/082773 A1 | 10/2003 |
| WO | WO2004/011124 A1 | 2/2004 |
| WO | WO2004/011386 A1 | 2/2004 |

OTHER PUBLICATIONS

V.G. Milt, C.A. Querini, E.E. Miró, and M.A. Ulla. Abatement of diesel exhaust pollutants: NOx adsorption on Co,Ba,K/CeO2 catalysts, J. Catal. 2003, 220, 424-432.*

E.E. Miró, F. Ravelli, M.A. Ulla, L.M. Cornaglia, and C.A. Querini. Catalytic combustion of diesel soot on Co, K supported catalysts, Catal. Today 1999, 53, 631-638.*

* cited by examiner

*Primary Examiner*—Jerry Lorengo
*Assistant Examiner*—Carlos Barcena

(57) ABSTRACT

A catalyzed Diesel soot filter and process. The Diesel soot filter incorporates a porous filter element coated with a catalytic agent so that Diesel soot from Diesel exhaust gas is deposited into contact with the catalytic agent when Diesel exhaust gas is passed through the porous filter element and so that the ignition temperature or oxidation temperature of the deposited Diesel soot is reduced. The catalytic agent is a mixture of alkali metal and cerium oxides. The mole ratio of alkali metal to cerium of the catalytic agent is in the range of from 0.5 to 5.

6 Claims, 2 Drawing Sheets

CATALYZED DIESEL SOOT FILTER AND PROCESS

BACKGROUND

The instant invention relates to a catalyzed diesel soot filter and process for the reduction of the ignition temperature or oxidation temperature of Diesel soot filtered out of the exhaust gas of Diesel engines by a Diesel soot filter.

Diesel engines emit soot particles referred to herein as "Diesel soot". Diesel soot filters have been developed; see, for example, U.S. Pat. No. 5,098,455 to Doty, Moyer and Hughes, to filter Diesel soot from Diesel engine exhaust gas. Many prior art Diesel soot filters employ a honeycomb filter element encased in a sheet metal shell. The honeycomb filter element has an inlet end and an outlet end and a multiplicity of cells extending from the inlet end to the outlet end, the cells having porous walls. A fraction of the total number of cells at the inlet end are plugged and the remaining cells are plugged at the outlet end in a designed pattern so that Diesel engine exhaust flows through the porous walls of the filter element so that Diesel soot is filtered from the exhaust on and into the porous walls of the filter element. As discussed in U.S. Pat. No. 4,515,758 to Domesle et al., the temperature of Diesel engine exhaust gas under normal operating conditions is not sufficient to burn off the accumulated soot. Therefore, the back pressure of the exhaust gas through the filter increases over time to unacceptable levels.

One solution to the problem of soot accumulation in a Diesel soot filter is to periodically increase the temperature of the exhaust gas by, for example, electrically heating the exhaust gas or by burning an auxiliary fuel in the exhaust gas, to ignite and burn away the accumulated soot from the filter. Heating the exhaust gas to solve the problem of soot accumulation in the filter does, however, increase the fuel consumption of the Diesel engine.

A more efficient solution to the problem of soot accumulation in the filter is to coat the filter with a catalytic agent that reduces the temperature of ignition or oxidation of the accumulated soot. For example, the above referenced '758 patent coated a Diesel soot filter with a catalyst selected from lithium oxide, copper chloride, vanadium oxide/alkali metal oxide combinations, a vanadate of an alkali metal or of cerium, or a silver or alkali metal perrhenate, preferably of sodium or silver, or mixtures of these substances in order to reduce the ignition temperature or oxidation temperature of the accumulated soot. U.S. Pat. No. 6,248,689 to Manson disclosed a catalytic agent incorporating Platinum Group Metals (PGM's) that reduced the ignition temperature or oxidation temperature sufficiently so that the catalyzed diesel soot filter was self-regenerating at most diesel exhaust gas temperatures.

Despite the past advances made in the development of a Diesel soot filter catalyzed to reduce the ignition temperature or oxidation temperature of soot trapped therein, it would be a further advance in the art if such a catalyzed Diesel soot filter were discovered that used a less expensive catalyst.

SUMMARY OF THE INVENTION

The instant invention is a solution, at least in part, to the above-mentioned problems of prior art catalyzed Diesel soot filters. More specifically, the instant invention is an improved catalyzed Diesel soot filter incorporating a porous filter element coated with a catalytic agent so that Diesel soot from Diesel exhaust gas is deposited into contact with the catalytic agent when Diesel exhaust gas is passed through the porous filter element and so that the ignition temperature or oxidation temperature of the deposited Diesel soot is reduced (reduced in relation to the ignition temperature or oxidation temperature of an uncoated porous filter element). The improvement comprises that the catalytic agent comprises an alkali metal, preferably, potassium, plus cerium and oxygen. The mole ratio of alkali metal to cerium of the catalytic agent is from 0.5 to 5. The porous filter element can be, for example, porous silicon carbide, cordierite or more preferably, acicular mullite. The amount of catalytic agent coated on the porous filter element is preferably in the range of from ten to six hundred grams (and more preferably in the range of from twenty five to one hundred grams) of catalytic agent per liter of porous filter element. The catalytic agent can contain a platinum group metal if desired. The catalytic agent can be prepared by evaporating water from an aqueous solution of potassium and cerium ions to yield a solid residue that is then calcined to convert the potassium and cerium to a composition believed to contain potassium and cerium oxides. The amount of potassium in the catalytic agent is preferably in the range of from ten to twenty five weight percent and the amount of cerium is preferably in the range of from about thirty to about seventy weight percent.

In another embodiment, the instant invention is a process for the reduction of the ignition temperature or oxidation temperature of Diesel soot filtered from the exhaust gas of a Diesel engine. The process comprises the step of contacting the exhaust gas with a catalytic agent comprising an alkali metal, cerium and oxygen, the mole ratio of alkali metal to cerium of the catalytic agent being in the range of from 0.5 to 5. Preferably, the catalytic agent is coated on a porous filter element such as porous silicon carbide, cordierite or more preferably, acicular mullite. The amount of catalytic agent coated on the porous filter element is preferably in the range of from ten to six hundred grams (and more preferably in the range of from twenty five to one hundred grams) of catalytic agent per liter of porous filter element. The catalytic agent can contain a platinum group metal if desired. The catalytic agent can be prepared by evaporating water from an aqueous solution of potassium and cerium ions to yield a solid residue that is then calcined. The amount of potassium in the catalytic agent is preferably in the range of from ten to twenty five weight percent and the amount of cerium is preferably in the range of from about thirty to about seventy weight percent.

DETAILED DESCRIPTION OF THE INVENTION

Figure 1:
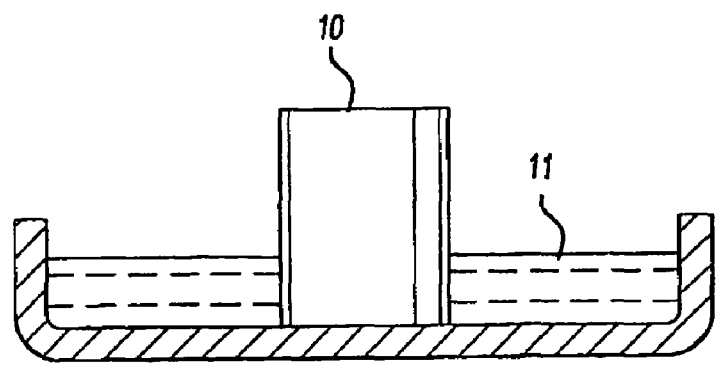
FIG. 1 shows a porous acicular mullite filter element being dipped into an aqueous solution comprising potassium and cerium ions to produce a wetted filter element.

Referring now to FIG. 1, therein is shown a 2.5 liter bulk volume porous acicular mullite filter element 10 being dipped into an aqueous solution 11 comprising potassium and cerium to produce a wetted filter element. The filter element 10 is made according to the teachings of U.S. Pat. No. 5,098,455 and PCT publication WO 03/082773 A1, herein fully incorporated by reference. The aqueous solution 11 is prepared by dissolving 60 grams of potassium carbonate in one half liter of one molar cerium (IV) nitrate solution (Alfa Aesar). The acicular mullite filter element wicks the aqueous solution into its porous walls by capillary attraction. It should be understood that although potassium is the preferred alkali metal in the catalytic agent of the instant invention, any alkali metal (except francium) can be used.

Figure 2:
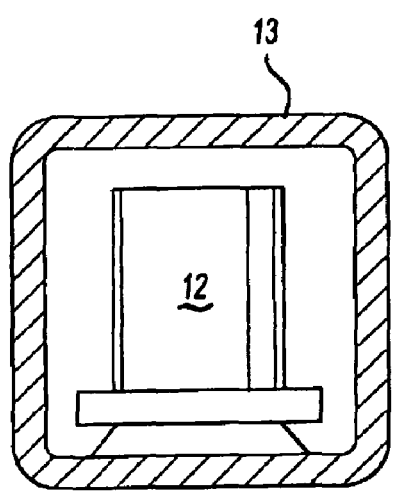
FIG. 2 shows the wetted filter element of FIG. 1 being placed in an oven at 120 degrees Celsius to produce a dried filter element.
Figure 3:
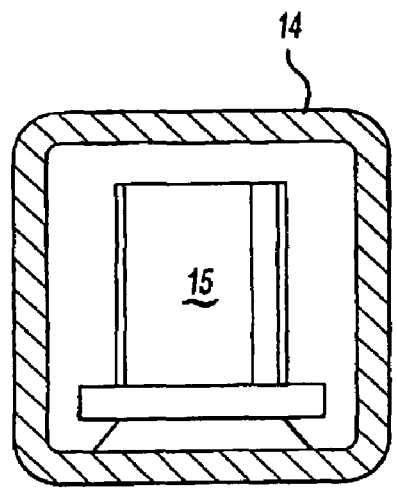
FIG. 3 shows the dried filter element of FIG. 2 being placed in an oven at 650 degrees Celsius to produce a calcined filter element.

Referring now to FIG. 2, therein is shown the wetted filter element of FIG. 1 being placed in an oven 13 at 120 degrees Celsius to evaporate the water from the filter element to produce a dried filter element 12. It should be understood that the specific drying temperature used is not critical in the instant invention. Referring now to FIG. 3, therein is shown the dried filter element of FIG. 2 being placed in an oven 14 heating to 650 degrees Celsius (from room temperature at a rate of five degrees Celsius per minute) to produce a calcined filter element 15. It should be understood that the specific calcining temperature used in the instant invention is not critical and that, for example and without limitation thereto, the calcining temperature can range from 200 to 1000 degrees Celsius.

The calcined filter element has walls of acicular mullite coated with a catalytic agent comprising potassium, cerium and oxygen. The potassium content of the catalytic agent is about 27 percent by weight. The cerium content of the catalytic agent is about 56 percent by weight. The oxygen content of the catalytic agent is about 17 percent by weight. The calcined filter element contains about 125 grams of catalytic agent.

The exact nature of the catalytic agent is not known and does not need to be known to make and use the instant invention. The catalytic agent is believed to comprise a cerium oxide phase and a phase comprising alkali metal/cerium oxide.

Figure 4:
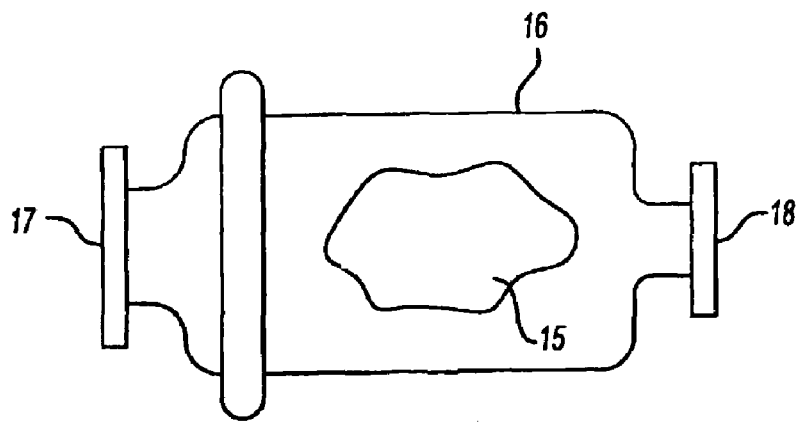
FIG. 4 shows the calcined filter element of FIG. 3 installed in a sheet metal shell having an inlet and an outlet so that Diesel exhaust gas directed into the inlet of the shell passes through the filter element and then out the outlet of the shell.

Referring now to FIG. 4, therein is shown the calcined filter element 15 of FIG. 3 installed in a sheet metal shell 16 to produce an improved Diesel soot filter of the instant invention having an exhaust gas inlet 17 and an exhaust gas outlet 18 so that Diesel exhaust gas directed into the inlet of the shell passes through the porous walls of the filter element and then out the outlet of the shell.

A convenient means of evaluating a catalytic agent of the instant invention is thermogravimetric analysis (TGA). The catalytic agent of the instant invention can be prepared by melting together alkali metal nitrate and cerium nitrate hexahydrate followed by calcination at 850 Celsius for twelve hours. TGA samples can be prepared by, for example, mixing 125 milligrams of powdered catalyst with 10 milligrams of carbon black (such as Regal 330R carbon black from Cabot Corp.) in a mechanical mixer. Thermogravimetric analysis of the mixture can be carried out in air by heating the sample at ten degrees Celsius per minute to 650 degrees Celsius after a ten minute hold at 150 degrees Celsius.

Figure 5:
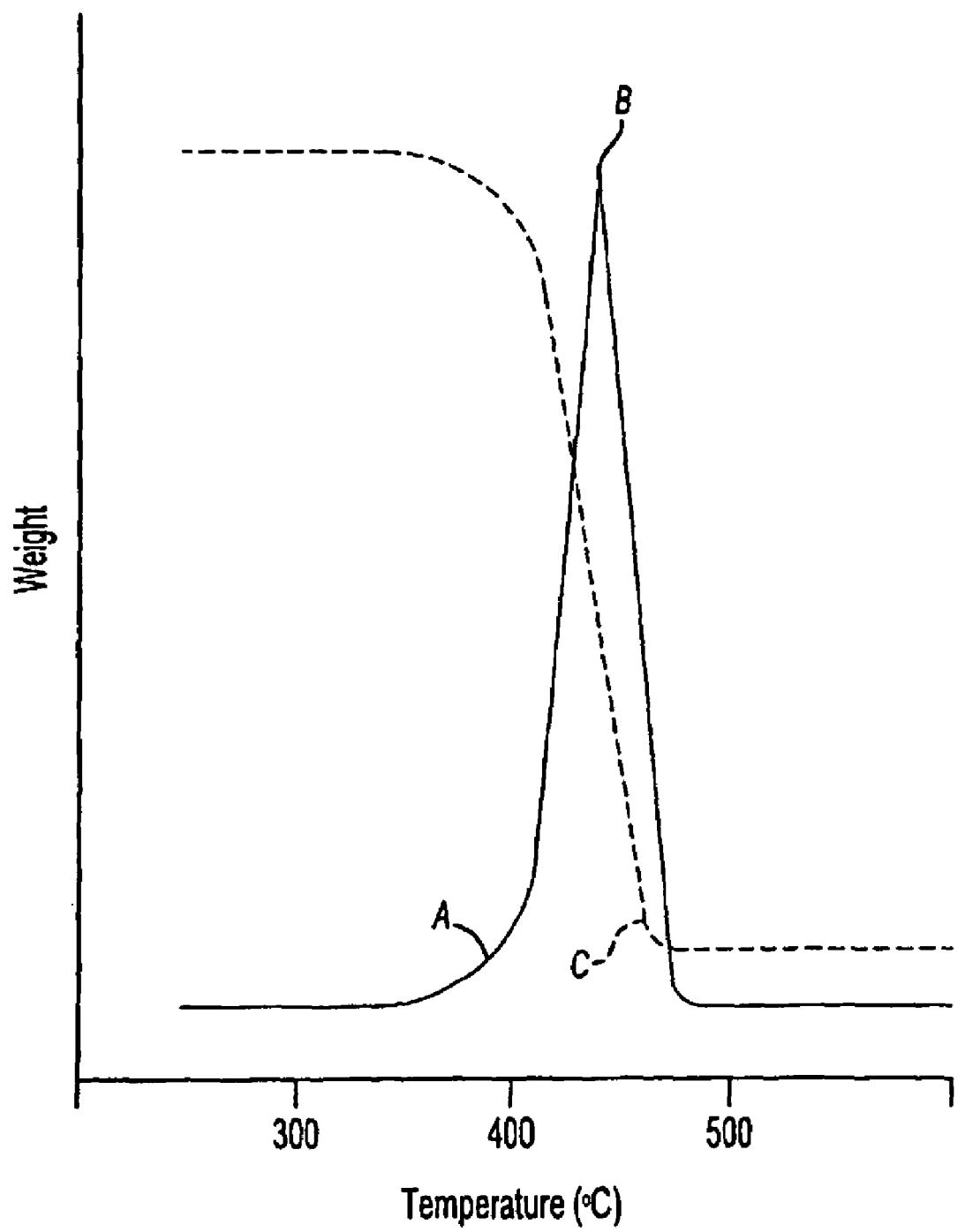
FIG. 5 shows a thermogravimetric analysis plot of a mixture of carbon black and a catalytic agent of the instant invention.

Referring now to FIG. 5, therein is shown a thermogravimetric analysis for such a mixture wherein the alkali metal is potassium and the percentage of potassium is 10 percent of the potassium/cerium oxide of the catalytic agent. The dashed curve in FIG. 5 shows the weight loss of the mixture v. temperature. The solid curve in FIG. 5 shows the first derivative of the weight loss curve. The onset temperature is point A of the derivative curve of FIG. 5 and is defined as the temperature at which the derivative curve has a value of 0.02 percent per degree Celsius, the maximum rate temperature is point B of the derivative curve of FIG. 5 and is defined as the maxima of the derivative curve. The completion temperature is point C of the weight loss curve of FIG. 5 and is defined as the temperature at which 95 percent of the maximum mass lost between 300 degrees Celsius and 600 degrees Celsius has occurred.

The following table lists such data for a number of different catalytic agent compositions of the instant invention and comparative catalytic agent compositions. The maximum rate data in the following table is the rate of weight loss at the maximum rate temperature in terms of weight percent loss per degree Celsius.

|  | Alkali | COMPOSITION Mole ratio Alkali/Ce | MAXIMUM RATE TEMPERATURE (° C.) | ONSET TEMPERATURE | COMPLETION TEMPERATURE | MAXIMUM RATE |
|---|---|---|---|---|---|---|
| Comp Ex A | K | 0.05 | 456 | 379 | 535 | 0.09 |
| Comp Ex B | K | 0.10 | 435 | 361 | 486 | 0.11 |
| Comp Ex C | K | 0.25 | 435 | 362 | 468 | 0.14 |
| Example A | K | 0.5 | 433 | 363 | 455 | 0.21 |
| Example B | K | 1.0 | 433 | 363 | 484 | 0.15 |
| Example C | Na | 1.0 | 444 | 388 | 463 | 0.20 |
| Example D | Li | 1.0 | 484 | 436 | — | 0.11 |
| Example E | Cs | 1.0 | 380 | 348 | 425 | 0.15 |

Acicular mullite is the preferred material for the porous filter element because of its high porosity and durability. However, it should be understood that any suitable porous filter element can be used in the instant invention including, for example, felted metal fibers such as felted nickel fibers as well as porous ceramic materials such as porous silicon carbide, porous cordierite, the aluminum titanate based material of PCT publication WO 2004/011386 A1, the mullite-aluminum titanate based material of PCT publication WO 2004/011124 A1, the strontium feldspar aluminum titanate based material of PCT publication WO 03/078352 A1 as well as the composite cordierite material of PCT publication WO 03/051488 A1.

The amount of catalytic agent coated on the porous filter element is preferably in the range of from ten to six hundred grams of catalytic agent per liter of porous filter element. The term "per liter of porous filter element means the bulk volume of the filter element and not the volume of the walls of the filter element. When the amount of catalytic agent coated on the porous filter element is more than about six hundred grams of catalytic agent per liter of porous filter element, then the porosity of the porous filter element is usually reduced to a value that is not acceptable. When the amount of catalytic agent coated on the porous filter element is less than about ten grams of catalytic agent per liter of porous filter element, then the ignition temperature or oxidation temperature is usually not reduced to a value that is acceptable and/or the operational life of the system may be relatively short. It should be understood that the term "ignition temperature" and the term "oxidation temperature" are used interchangeably herein.

The amount of catalytic agent coated on the porous filter element is more preferably in the range of from twenty five to one hundred grams of catalytic agent per liter of porous filter element. Preferably, the catalytic agent is evenly coated on the porous filter element. Evenly, herein, means that the catalyst coating at the outer portion of a coated porous filter element has an amount of catalyst that is within about 30% of the amount of catalyst near the center of said filter element. It is preferred that the catalyst coating at the outer portion of the filter element is within 20%, more preferably within 15%, and most preferably within 10% of the catalyst near the center of the filter element. It is further preferred that the coating thickness is less than the average smallest dimension of the grains or fibers of the porous filter element.

The relative amount of alkali metal, cerium and oxygen used in the catalytic agent of the instant invention is important. The mole ratio of alkali metal to cerium of the catalytic agent should be in the range of from 0.5 to 5. More preferably, the alkali metal is potassium and the amount of potassium in the catalytic agent is in the range of from ten to about twenty five weight percent of the catalytic agent and the amount of cerium in the catalytic agent is in the range of from about seventy to about thirty weight percent of the catalytic agent. However, the amount of cerium can be in the range of from about eight to about seventy weight percent of the catalytic agent. Most preferably, the catalytic agent comprises more than seventy weight percent of potassium and cerium. However, it should be understood that the catalytic agent can comprise other elements such as, magnesium, zirconium, rare earth elements other than cerium, or a platinum group metal (s).

The addition of a platinum group metal(s) to the catalytic agent of the instant invention will, among other things, reduce the level of carbon monoxide and hydrocarbon emitted from the Diesel soot filter of the instant invention. A platinum group metal can be added to the catalytic agent of the instant invention by, for example, adding the metal as a nitrate salt to the aqueous solution of potassium and cerium in the above described procedure. Although the amount of platinum group metal(s) so added can range, for example, from one to twenty weight percent of the catalytic agent, preferably the amount of platinum group metal(s) so added is in the range of from one to two percent of the catalytic agent because of the added expense of the addition of platinum group metal(s) to the catalytic agent.

It should be understood that when platinum (or other platinum metal group metal such as palladium, rhodium, iridium, ruthenium or osmium) is used in the instant invention, the platinum can be wash coated only on the outlet channels of a diesel soot filter or that the platinum can be deposited only at the outlet end portion of the diesel soot filter. In addition to or in place of a platinum group metal, silver or gold can be used in the instant invention.

Example 1

The Diesel soot filter described above in relation to FIGS. 1-4 is installed in the exhaust system of a 1.9 liter displacement, four-cylinder, Diesel engine system Soot is deposited on the filter by operating the Diesel engine at 20 percent of maximum load, 2500 rpm, and a constant EGR rate. The exhaust temperature at the filter inlet is less than 250° C. The soot filtration efficiency is greater than 95 percent.

Catalyst activity is evaluated by determining the inlet temperature to the filter required to achieve continuous regeneration. Continuous regeneration is achieved by increasing the exhaust temperature to a temperature at which the back pressure across the filter remains constant for a given engine under specified set conditions (2500 rpm, torque of 34 ft-lbs) at a soot loading between 2 and 4 g/l on the filter. During the determination of the continuous regeneration temperature (CRT) an inline electric gas heater is installed in the exhaust line before the filter. The electric heater is used to increase the exhaust temperature without changing the exhaust composition or the engine operating conditions. The temperature of the exhaust was increased from 250 C in steps of 50 C until a decrease in the pressure drop across the filter is observed. The continuous regeneration temperature is 400 degrees Celsius.

Comparative Example 1

For comparison, a prior art Diesel soot filter is then connected to the above described Diesel engine system of Example 1. The filter element of the prior art Diesel soot filter is the same as the above described filter element of the Diesel soot filter of the instant invention but the prior art filter element is not coated with a catalytic agent. The continuous regeneration temperature is 500 degrees Celsius. The electrical energy (or the amount of auxiliary fuel) required to heat the exhaust gas to a temperature of 400 degrees Celsius of Example 1 is less than the electrical energy (or the amount of auxiliary fuel) required to heat the exhaust gas to 500 degrees Celsius of this Comparative Example 1. Therefore, the use of the Diesel soot filter of the instant invention results in a more efficient operation of the Diesel engine.

Example 2

The Diesel soot filter of EXAMPLE 1 is again installed on the above described Diesel engine system. The Diesel engine is operated with the electric exhaust gas heater turned off until the Diesel soot filter has collected about sixteen grams of Diesel soot. The soot collection efficiency is about 98 percent. The back pressure increases from about 12 to about 24 inches of water during the collection of the sixteen grams of soot. The temperature of the Diesel exhaust gas is then increased using the electric exhaust gas heater to a temperature of 500 degrees Celsius for ten minutes. The back pressure decreases to about 12 inches of water because soot is oxidized in the filter at a rate faster than soot accumulates in the filter when the exhaust gas entering the filter is heated to a temperature of 500 degrees Celsius for ten minutes. After the electric exhaust gas heater is turned off, the back pressure then increases from about 12 to about 24 inches of water. The electric exhaust gas heater is again turned on to heat the exhaust gas to a temperature of 500 degrees Celsius for ten minutes to ignite the soot in the filter.

The amount of electrical energy (or the amount of auxiliary fuel) required to periodically heat the exhaust gas to a temperature of 500 degrees Celsius for ten minutes is less that the amount of electrical energy (or the amount of auxiliary fuel) required to continuously heat the exhaust gas to a temperature of 400 degrees Celsius of Example 1. Thus, the periodic exhaust gas heating mode of operation is preferred in the instant invention.

Example 3

The procedure of Example 1 is repeated but with a filter element coated with the same weight and composition of catalytic agent but containing about one percent by weight of platinum. The "continuous regeneration temperature" of the system is the same as the system of Example 1.

CONCLUSION

In conclusion, although the invention has been described above in relation with its preferred embodiments, it should be understood that the instant invention is not limited thereby but is intended to cover all alternatives, modifications and equivalents that are included within the scope of the invention as defined by the following claims.

What is claimed is:

1. An improved catalyzed diesel soot filter incorporating a porous filter element coated with a catalytic agent so that diesel soot from diesel exhaust gas is deposited into contact with the catalytic agent when diesel exhaust gas is passed through the porous filter element and so that the ignition temperature or oxidation temperature of the deposited diesel soot is reduced, wherein the improvement comprises: the catalytic agent consisting of an alkali metal, cerium, and oxygen, the mole ratio of alkali metal to cerium of the catalytic agent being from 0.5 to 5, wherein the alkali metal comprises potassium and the amount of potassium of the catalytic agent is in the range of from ten to about twenty five weight percent and the amount of cerium is in the range of from about thirty to about seventy weight percent.

2. The improved catalyzed Diesel soot filter of claim 1, wherein the porous filter element comprises a ceramic material selected from the group consisting of silicon carbide, cordierite and mullite.

3. The improved catalyzed Diesel soot filter of claim 1, wherein the porous filter element comprises acicular mullite and wherein the amount of catalytic agent coated on the porous filter element is in the range of from ten to 1000 grams of catalytic agent per liter of porous filter element.

4. The improved catalyzed Diesel soot filter of claim 3, wherein the catalytic agent is produced by evaporating water from an aqueous solution of potassium and cerium to yield a solid residue that is then calcined.

5. The improved catalyzed Diesel soot filter of claim 1, wherein the catalytic agent is produced by evaporating water from an aqueous solution of potassium and cerium to yield a solid residue that is then calcined.

6. The improved catalyzed diesel soot filter of claim 1, wherein the amount of catalytic agent coated on the porous filter element is in the range of from twenty five to one hundred grams per liter of porous filter element.

* * * * *